(12) United States Patent
Buravalla

(10) Patent No.: US 12,392,245 B2
(45) Date of Patent: Aug. 19, 2025

(54) TURBINE ENGINE AIRFOIL WITH A CRUSH INITIATOR

(71) Applicant: GENERAL ELECTRIC COMPANY, Schenectady, NY (US)

(72) Inventor: Vidyashankar Ramasastry Buravalla, Bangalore (IN)

(73) Assignee: General Electric Company, Evendale, OH (US)

( * ) Notice: Subject to any disclaimer, the term of this patent is extended or adjusted under 35 U.S.C. 154(b) by 109 days.

(21) Appl. No.: 18/312,122

(22) Filed: May 4, 2023

(65) Prior Publication Data

US 2024/0318558 A1    Sep. 26, 2024

(30) Foreign Application Priority Data

Mar. 23, 2023    (IN) .............................. 202311020376

(51) Int. Cl.
    *F01D 5/14*    (2006.01)
    *F02C 7/00*    (2006.01)

(52) U.S. Cl.
    CPC ............... *F01D 5/147* (2013.01); *F02C 7/00* (2013.01)

(58) Field of Classification Search
    CPC ........ F01D 5/147; F01D 5/282; F01D 21/045; F04D 29/388; F04D 29/324; F05D 2220/36; F02C 7/00
    See application file for complete search history.

(56) References Cited

U.S. PATENT DOCUMENTS

| | | |
|---|---|---|
| 8,241,003 B2 | 8/2012 | Roberge et al. |
| 8,241,004 B2 | 8/2012 | Strother |
| 8,579,181 B2 | 11/2013 | Strother et al. |
| 9,249,668 B2 * | 2/2016 | Fisk .......................... F01D 5/16 |
| 10,415,588 B2 | 9/2019 | Roche |
| 10,577,206 B2 | 3/2020 | Okubo et al. |
| 10,661,337 B1 | 5/2020 | Heneveld et al. |

(Continued)

FOREIGN PATENT DOCUMENTS

CN    103089323 B2    1/2015

OTHER PUBLICATIONS

"RLC Engine Components", webpage <https://www.rlc-group.com/what-we-do/products/engine-components/>, 13 pages, accessed Mar. 13, 2023.

(Continued)

*Primary Examiner* — Courtney D Heinle
*Assistant Examiner* — Andrew Thanh Bui
(74) *Attorney, Agent, or Firm* — McGarry Bair PC

(57) ABSTRACT

A gas turbine engine includes a fan section, a compressor section, combustor section, and turbine section in serial flow arrangement, and defining an engine centerline. An airfoil is located in one of the fan section, the compressor section, or the turbine section. The airfoil defines an interior and extends between a leading edge and a trailing edge defining a chord-wise direction, and extending between a root and a tip defining a span-wise direction. At least one stiffener is located within the interior, having a deformation threshold, and including at least one crush initiator formed on the at least one stiffener. The crush initiator determines deformation geometry of the at least one stiffener in response to a force acting on the at least one stiffener exceeding the deformation threshold.

20 Claims, 15 Drawing Sheets

(56) References Cited

U.S. PATENT DOCUMENTS

| | | |
|---|---|---|
| 10,808,541 B2 | 10/2020 | Bales et al. |
| 11,821,319 B2 * | 11/2023 | Yadav ................... F01D 5/282 |
| 12,209,506 B2 * | 1/2025 | Heeter ................... F02K 3/06 |
| 2005/0008492 A1 * | 1/2005 | Whitehead ............... F01D 5/18 |
| | | 416/229 R |
| 2009/0191381 A1 * | 7/2009 | Wallis ................... F01D 5/282 |
| | | 428/156 |
| 2010/0239427 A1 | 9/2010 | Strother |
| 2014/0377484 A1 | 12/2014 | Oxley et al. |
| 2016/0347481 A1 | 12/2016 | Keshtkar et al. |
| 2020/0018236 A1 | 1/2020 | Tsuru et al. |
| 2020/0378273 A1 * | 12/2020 | Yadav ................... F01D 21/045 |

OTHER PUBLICATIONS

Aviation Week, "AirAsia X Trent 700 Failure Leads to Fan Blade Redesign", website <https://aviationweek.com/air-transport/aircraft-propulsion/airasia-x-trent-700-failure-leads-fan-blade-redesign>, 2 pages, accessed Mar. 13, 2023.

* cited by examiner

TURBINE ENGINE AIRFOIL WITH A CRUSH INITIATOR

The present disclosure relates generally to an airfoil or component of a gas turbine, and more specifically to an airfoil having a feature for controlled deformation under loading.

BACKGROUND

A turbine engine typically includes an engine core with a compressor section, a combustor section, and a turbine section in serial flow arrangement. A fan section can be provided upstream of the compressor section. The compressor section compresses air which is channeled to the combustor section where it is mixed with fuel, where the mixture is then ignited for generating hot combustion gases. The combustion gases are channeled to the turbine section which extracts energy from the combustion gases for powering the compressor section, as well as for producing useful work to propel an aircraft in flight or to power a load, such as an electrical generator.

Airfoils can be utilized in the fan section, compressor section, or turbine section to move a volume of air within the turbine engine. During engine operation, the airfoils are rotated to generate thrust, and are subject to forces or loads in order to drive the volume of air, or can be subject to other excessive forces.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
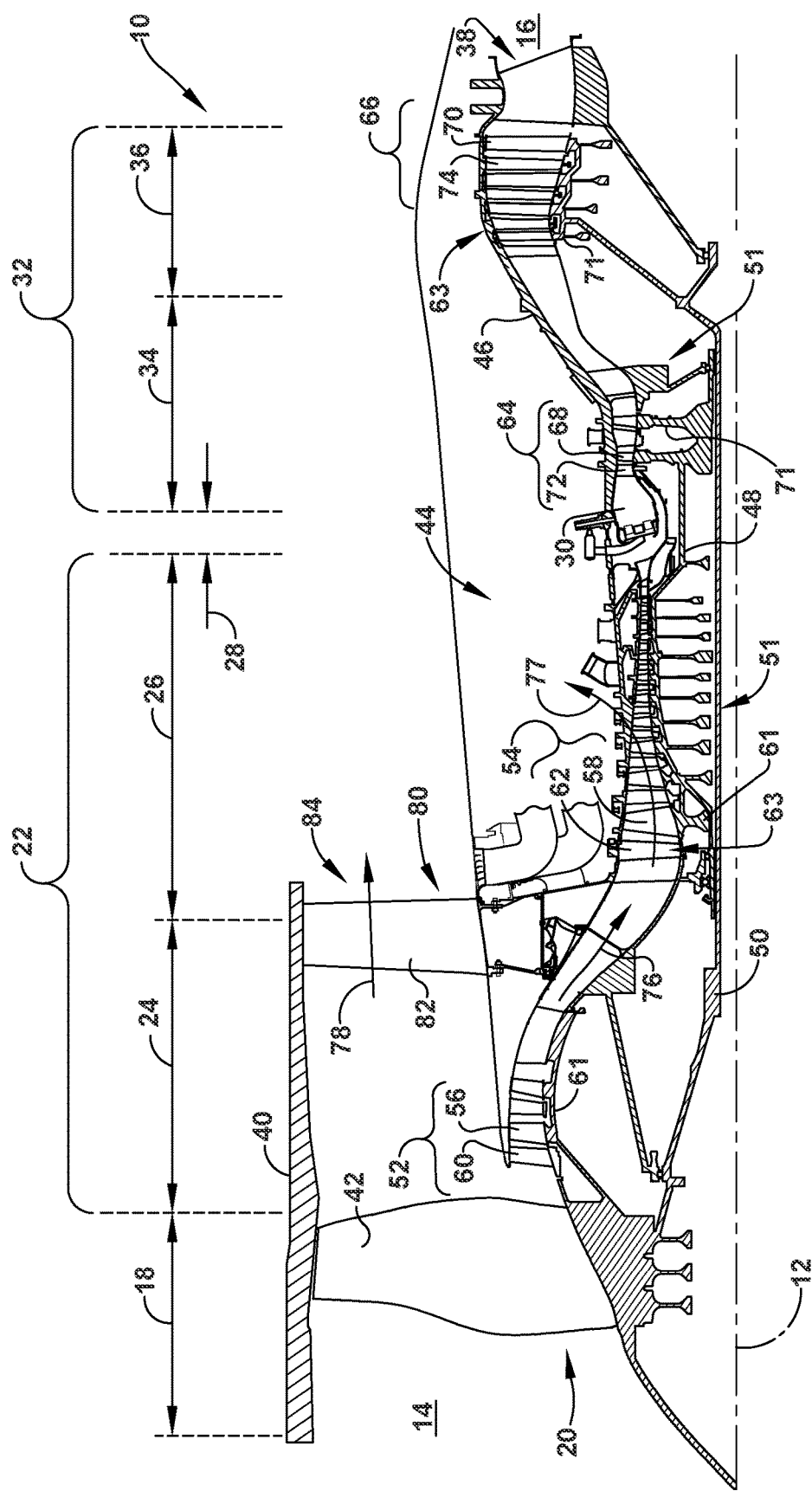
FIG. 1 is a schematic cross-sectional view of a turbine engine in accordance with an exemplary embodiment of the present disclosure.

Aspects of the disclosure herein are directed to a crush initiator structure for an engine component or a stiffener within an engine component, such as an airfoil. It should be understood that the disclosure applies to other engine components of the turbine engine, not just an airfoil. Further, while described in terms of a rotatable airfoil, it will be appreciated that the present disclosure is applied to any other suitable environment. Stiffeners or other features utilized within interior or structural portions of engine components increase structural integrity of the components using said stiffeners, and crush initiator features determine a geometry or shape of deformation for the stiffener or engine component.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first" and "second" may be used interchangeably to distinguish one component from another and are not intended to signify location or importance of the individual components unless otherwise indicated.

As used herein, the term "upstream" refers to a direction that is opposite the fluid flow direction, and the term "downstream" refers to a direction that is in the same direction as the fluid flow. The terms "fore" or "forward" mean in front of something and "aft" or "rearward" mean behind something. For example, when used in terms of fluid flow, fore/forward can mean upstream and aft/rearward can mean downstream.

The term "fluid" may be a gas or a liquid, or multi-phase.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, vertical, upstream, downstream, forward, aft, etc.) as may be used herein are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a," "an," and "the" include plural references unless the context clearly dictates otherwise. Furthermore, as used herein, the term "set" or a "set" of elements can be any number of elements, including only one.

The term "composite," as used herein is, is indicative of a component having two or more materials A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC), carbon fibers, a polymeric resin, thermoplastics, bismaleimide (BMI) materials, polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high-performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of a material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the ceramic matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these material can offer.

As used herein, the term "stiffness" may be used as defining the extent to which a structure resists deformation in response to force. Stiffness can be defined as the ratio of force to displacement of the object under said force. Stiffness can include resisting deformation in response to force applied from various directionalities, whereby the stiffness can represent an axial stiffness, tensile stiffness, compression stiffness, torsional stiffness, or shear stiffness in non-limiting examples.

The inventors' practice has proceeded in the foregoing manner of designing a stiffener or engine component to have controlled deformation in response to excessive loading, identifying whether or not the component was manufactured as designed and satisfies component objectives, and modifying the engine component with new geometric characteristics of the engine component cannot be manufactured or does not satisfy component objectives. This process is repeated during the design of several different types of components, such as those shown in the figures contained herein.

FIG. 1 is a schematic cross-sectional diagram of a gas turbine engine 10 for an aircraft. The gas turbine engine 10 has a generally longitudinally extending axis or engine centerline 12 extending from a forward 14 to an aft 16. The gas turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form an engine core 44 of the gas turbine engine 10, which generates combustion gases. The engine core 44 is surrounded by a core casing 46, which can be coupled with the fan casing 40. In one alternate example, the gas turbine engine 10 can be an external rotor turbine engine with an unducted fan, without the exterior fan casing 40.

An HP shaft or HP spool 48 disposed coaxially about the engine centerline 12 of the gas turbine engine 10 drivingly connects the HP turbine 34 to the HP compressor 26. An LP shaft or spool 50, which is disposed coaxially about the engine centerline 12 of the gas turbine engine 10 within the greater diameter annular HP spool 48, drivingly connects the LP turbine 36 to the LP compressor 24 and fan 20. The HP and LP spools 48, 50 are rotatable about the engine centerline 12 and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 are arranged in a ring and extend radially outwardly relative to the engine centerline 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor mount to (or are formed integral with) a disk 61, which is mounted to the corresponding one of the HP and LP spools

48, 50. The static compressor vanes 60, 62 for a stage of the compressor mount to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 are arranged in a ring and extend radially outwardly relative to the engine centerline 12 while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine mount to a disk 71, which is mounted to the corresponding one of the HP and LP spools 48, 50. The static turbine vanes 72, 74 for a stage of the compressor mount to the core casing 46 in a circumferential arrangement.

Complementary to the rotor portion, the stationary portions of the gas turbine engine 10, such as the static vanes 60, 62, 72, 74 among the compressor and turbine sections 22, 32 are also referred to individually or collectively as a stator 63. As such, the stator 63 refers to the combination of non-rotating elements throughout the gas turbine engine 10.

In operation, the airflow exiting the fan section 18 is split such that a portion of the airflow is channeled into the LP compressor 24, which then supplies a pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and an exhaust gas is ultimately discharged from the gas turbine engine 10 via the exhaust section 38. The driving of the LP turbine 36 drives the LP spool 50 to rotate the fan 20 and the LP compressor 24.

A portion of the pressurized airflow 76 is drawn from the compressor section 22 as bleed air 77. The bleed air 77 is drawn from the pressurized airflow 76 and provided to engine components requiring cooling. The temperature of pressurized airflow 76 entering the combustor 30 is greater relative to the bleed air temperature. The bleed air 77 may be used to reduce the temperature of the core components downstream of the combustor 30.

A remaining portion of the airflow exiting the fan section 18, a bypass airflow 78 bypasses the LP compressor 24 and engine core 44 and exits the gas turbine engine 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 are utilized adjacent the fan section 18 to exert some directional control of the bypass airflow 78.

Some of the air supplied by the fan 20 bypasses the engine core 44 and be used for cooling of portions, especially hot portions, of the gas turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
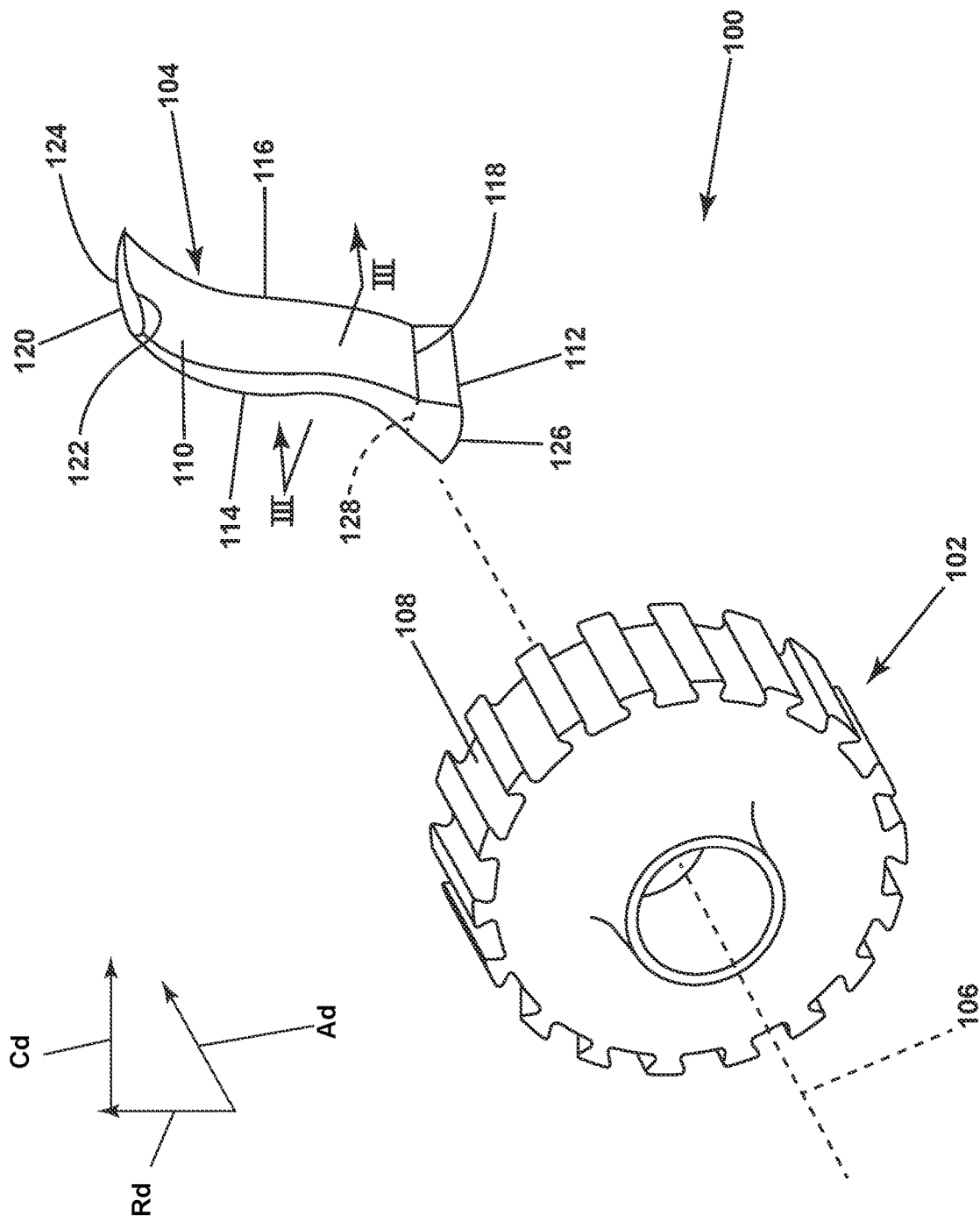
FIG. 2 is a schematic perspective view of a composite airfoil assembly and a disk assembly suitable for use within the turbine engine of FIG. 1, the composite airfoil assembly including an airfoil, in accordance with an exemplary embodiment of the present disclosure.

FIG. 2 is a schematic perspective view of an airfoil assembly 100 and a disk assembly 102 suitable for use within the gas turbine engine 10 of FIG. 1. The disk assembly 102 is suitable for use as the disk 61, 71 (FIG. 1) or any other disk such as, but not limited to, a disk within the fan section 18, the compressor section 22, or the turbine section 32 of the gas turbine engine 10. The airfoil assembly 100 can be rotating or non-rotating such that the airfoil assembly 100 includes an airfoil 104 as at least one of the static compressor vanes 60, 62 (FIG. 1), the set of compressor blades 56, 58 (FIG. 1), the static turbine vanes 72, 74 (FIG. 1), the set of turbine blades 68, 70 (FIG. 1), or the plurality of fan blades 42 (FIG. 1).

The disk assembly 102 is rotatable or stationary about a rotational axis 106. The rotational axis 106 coincides with or be offset from the engine centerline (e.g., the engine centerline 12 of FIG. 1). The disk assembly 102 includes a plurality of slots 108 extending axially through a radially outer portion of the disk assembly 102 and being circumferentially spaced about the disk assembly 102, with respect to the rotational axis 106.

The airfoil 104 includes an airfoil portion 110 and a dovetail portion 112 extending from the airfoil portion 110. The airfoil portion 110 extends between a leading edge 114 and a trailing edge 116 to define a chord-wise direction. The airfoil portion 110 extends between a root 118 and a tip 120 to define a span-wise direction. The airfoil portion 110 includes a pressure side 122 and a suction side 124. The dovetail portion 112 extends between a first end 126 and a second end 128 in the span-wise direction. The first end 126 is radially spaced inwardly from the second end 128, with respect to the rotational axis 106. The first end 126 defines a radial inner surface of the dovetail portion 112. The second end 128 denotes a transition between the dovetail portion 112 and the airfoil portion 110. As a non-limiting example, the second end 128 coincides with the root 118 of the airfoil portion 110. The dovetail portion 112 and the airfoil portion 110 can be integrally or non-integrally formed with each other.

The airfoil 104 couples to the disk assembly 102 by inserting at least a portion of the dovetail portion 112 into a respective slot of the plurality of slots 108. The airfoil 104 is held in place by frictional contact with the slot 108 or couples to the slot 108 via any suitable coupling method such as, but not limited to, welding, adhesion, fastening, or the like. While only a single airfoil 104 is illustrated, it will be appreciated that there can be any number of one or more airfoils 104 coupled to the disk assembly 102. As a non-limiting example, there can be a plurality of airfoils 104 corresponding to a total number of slots of the plurality of slots 108.

For the sake of reference, a set of relative reference directions, along with a coordinate system can be applied to the airfoil assembly 100. An axial direction (Ad), extends from forward to aft and is shown extending at least partially into the page. The axial direction (Ad) and is arranged parallel to the rotational axis 106. A radial direction (Rd) extends perpendicular to the axial direction (Ad), and extends perpendicular to the engine centerline 12 (FIG. 1). A circumferential direction (Cd) extends perpendicular to the radial direction (Rd), and extends as a ray extending perpendicular to the radial direction (Rd).

Figure 3:
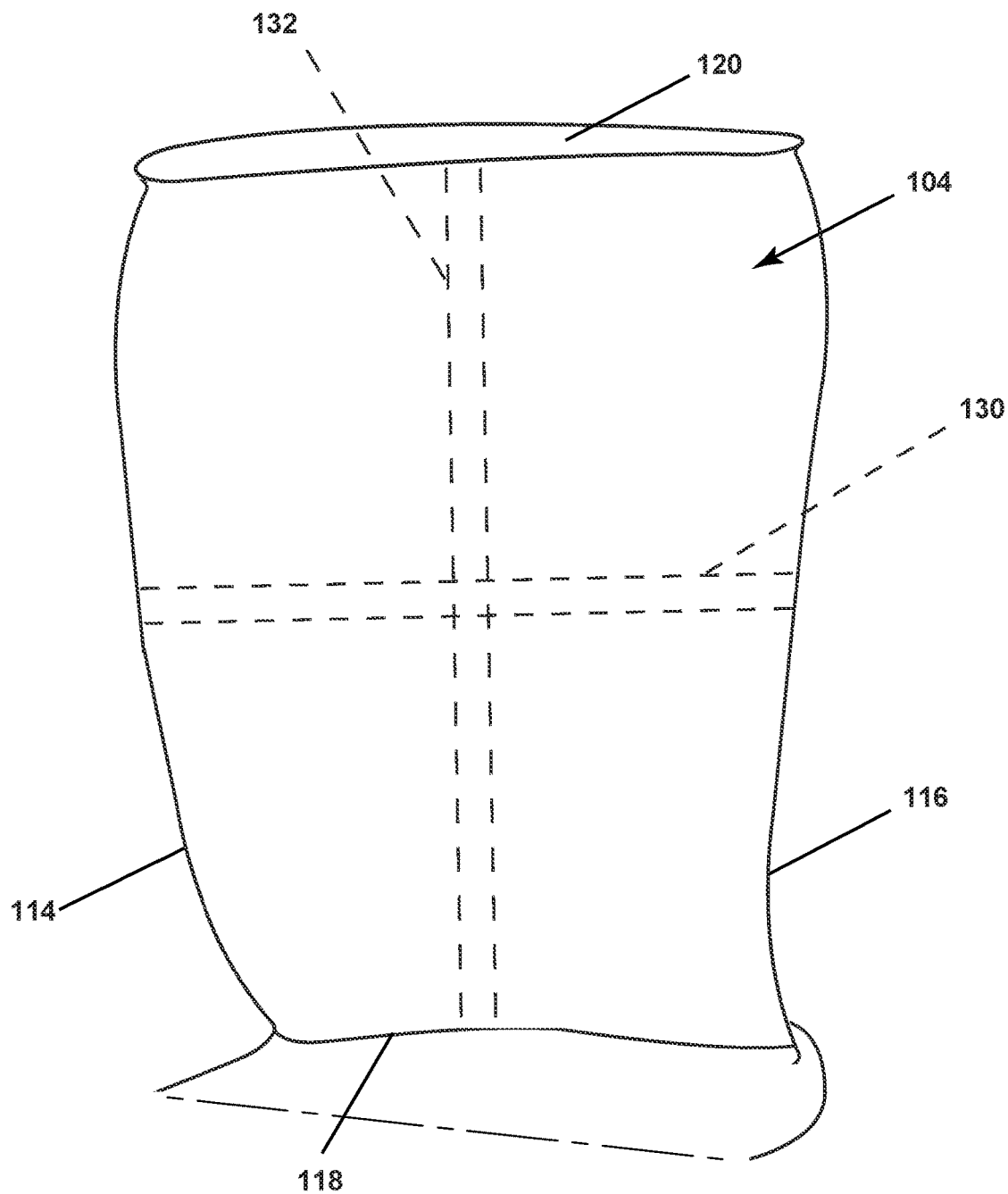
FIG. 3 is a perspective view of the airfoil of FIG. 2, including stiffeners, in accordance with an exemplary embodiment of the present disclosure.

FIG. 3 is a schematic perspective view of the airfoil 104 including a chord-wise stiffener 130 (in dashed line) and a span-wise stiffener 132 (in dashed line). The chord-wise stiffener 130 extends at least partially between the leading edge 114 and the trailing edge 116, while the span-wise stiffener 132 extends at least partially between the root 118 and the tip 120. The stiffeners 130, 132 need not be aligned with the chord-wise or span-wise directions, and it is contemplated that an angular offset from one or both of the chord-wise and/or span-wise direction is provided for one or more stiffeners 130, 132. Furthermore, while only two stiffeners are shown, or one stiffener in each direction, it should be contemplated that any number of stiffeners can be utilized, such as a set of stiffeners 130 or a set of stiffeners 132, extending in any direction or combination of directions, such as a combination of the span-wise and chord-wise directions.

The stiffeners 130, 132 increase structural integrity for the airfoil 104, which experiences strong engine operational or environmental forces. Excessive forces, such as those exceeding a deformation threshold, result in deformation of the airfoil 104. Such a deformation threshold can be relative to the inherent mechanical properties of the airfoil 104, such as stiffness, elasticity, shear strength, or tensile strength in non-limiting examples, where exceeding the deformation threshold results in a deformation of the airfoil 104. Non-limiting examples where forces exceed such a deformation threshold can include a bird strike or fan blade off (FBO). It is desirable to control such deformation of the airfoil 104 when such forces exceed the deformation threshold to minimize FBO loss and unbalance loads, as well as other cascading issues resultant from the original force exceeding the deformation threshold.

Figure 4:
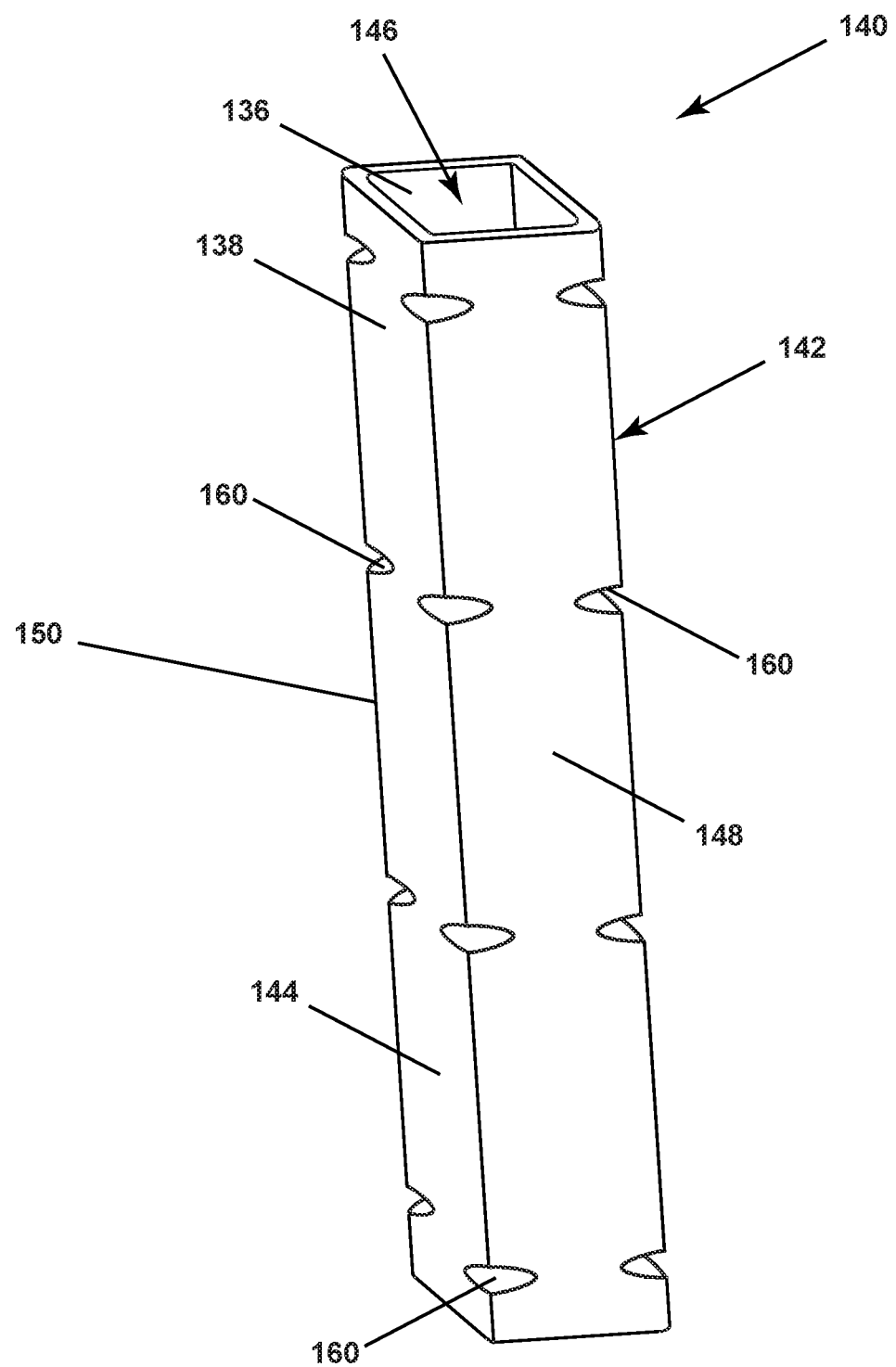
FIG. 4 is a perspective view of an exemplary stiffener of FIG. 3, including crush initiators, in accordance with an exemplary embodiment of the present disclosure.

Referring to FIG. 4, one exemplary stiffener 140, which may be the chord-wise or span-wise stiffeners 130, 132 of FIG. 3, includes a body 142 defining an outer wall 144 at least partially surrounding an interior 146. The outer wall 144 includes an interior surface 136 and an exterior surface 138. The outer wall 144 has a rounded-square profile, including a set of faces 148 and a set of corners 150. It should be appreciated that the rounded-square profile is exemplary, and the body 142 and outer wall 144 can include any suitable shape or geometry, or sectional shape thereof, including but not limited to square, rectangular, circular, cylindrical, rounded, curved, linear, curvilinear, or combinations thereof.

A set of crush initiators 160 are formed in the outer wall 144 as a set of recesses positioned in the corners 150. In alternative non-limiting examples, the set of crush initiators 160 can be formed as slots, slits, divots, dimples, protrusions, ridges, corrugations, openings, holes, recesses, structures, or other local areas having reduced mass or volume. In alternative examples, the crush initiators 160 can be positioned in the faces 148, the corners 150, or combinations thereof. The crush initiators 160 can be formed integrally within the stiffener 140, or can be formed as a separate element added or formed into the stiffener 140, in non-limiting examples. The crush initiators 160 can define a crush geometry for the stiffener 140, specifying a geometry for the stiffener 140 after experiencing a force suitable to deform the stiffener 140. In this way, the crush geometry can be an intended geometry for the stiffener 140 relative to a threshold force related to the deformation of the stiffener 140. The crush initiators 160 are deterministic features provided or otherwise formed into the stiffeners that determine a geometry or directionality for deformation of the stiffeners operating under excessive external forces. The particular position, arrangement, geometry, number, or other feature of the crush initiators 160 define the deterministic manner in which deformation of the stiffener 140 or airfoil 104 occurs.

In one non-limiting example, where the stiffener 140 extends in the spanwise direction within the airfoil 104 (FIG. 3), the set of crush initiators 160 can be positioned between 20% and 90% of the span defined in the span-wise direction, where 0% relates to the root 118 (FIG. 3) and where 100% relates to the tip 120 (FIG. 3). In another non-limiting example, where the stiffener 140 extends in the chord-wise direction, the set of crush initiators 160 can be positioned between 25% and 75% of the chord defined in the chord-wise direction, where 0% relates to the leading edge 114 (FIG. 3) and 100% relates to the trailing edge 116 (FIG. 3).

Figure 5:
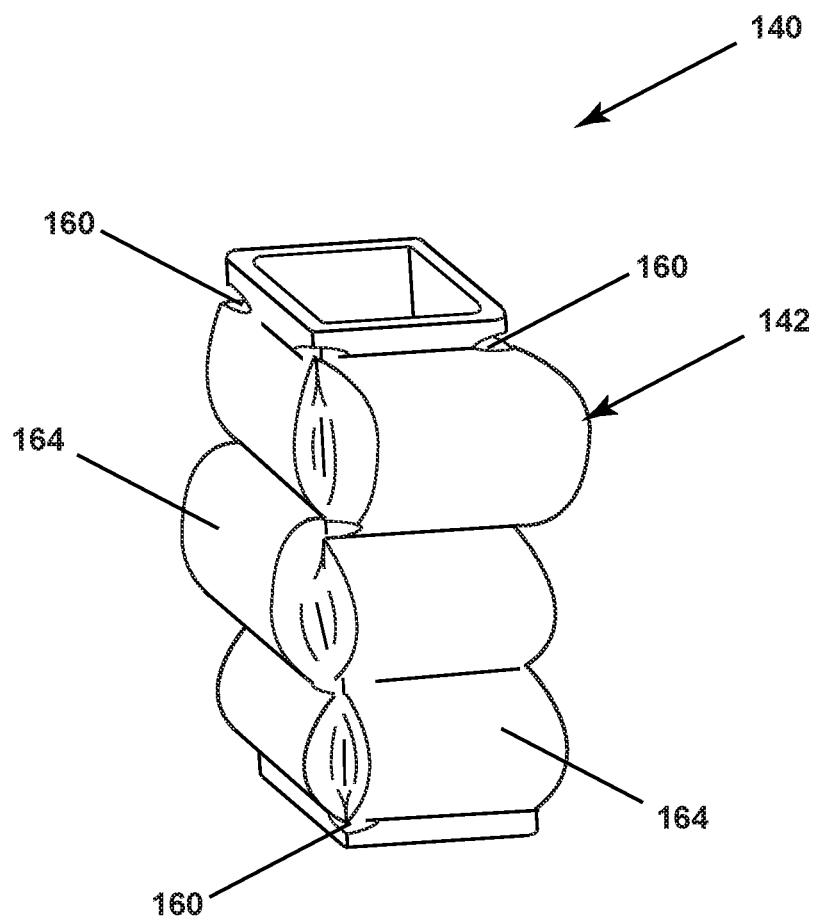
FIG. 5 shows the stiffener of FIG. 4 in a crumpled position crumpled about the crush initiators, in accordance with an exemplary embodiment of the present disclosure.

The stiffener 140 can include a non-deformed shape, such as that shown in FIG. 4, and a deformed shape shown in FIG. 5 resultant of the crush geometry as determined by the set of crush initiators 160, that is representative of a shape for the stiffener 140 after a force acts upon the stiffener 140 that exceeds a deformation threshold. The crush initiators 160 can be formed or otherwise provided in the stiffener 140 in the non-deformed shape in order to determine the resulting deformed shape resultant of the force. The stiffener 140 deforms, such as crumpling, buckling, crushing, bending, crinkling, collapsing, crimping, creasing, or otherwise changing its shape from the non-deformed shape to the deformed shape.

Referring to FIG. 5, the stiffener 140 is shown in a crumpled position having a set of crumples 164. In response to an external force, the stiffener 140 deforms in a manner determined by the crush initiators 160. As can be appreciated, the crumples 164 correspond to the positioning of the crush initiators 160. The crumples 164 are defined extending across the faces 148 (FIG. 4) between crush initiators 160 of a common height, such that the crumples 164 defining the deformed geometry of the deformed stiffener 140 are determined by the size, positioning, or geometry of the crush initiators 160.

Controlling the deformation geometry of the stiffeners 140 controls deformation of the airfoil 104 (FIG. 1), which decreases the impact on adjacent airfoils or elements, as well as decreasing global engine impact, which would otherwise cascade as increasing or multiplying issues. Controlling deformation under excessive forces reduces the consequent unbalance loads and system issues which would otherwise have a greater detrimental impact on engine operation or efficiency. Furthermore, utilizing the crush initiators 160 increases engine or component resilience to excessive forces while reducing overall mass and weight, thereby reducing engine weight and improving operational efficiency.

Figure 6:
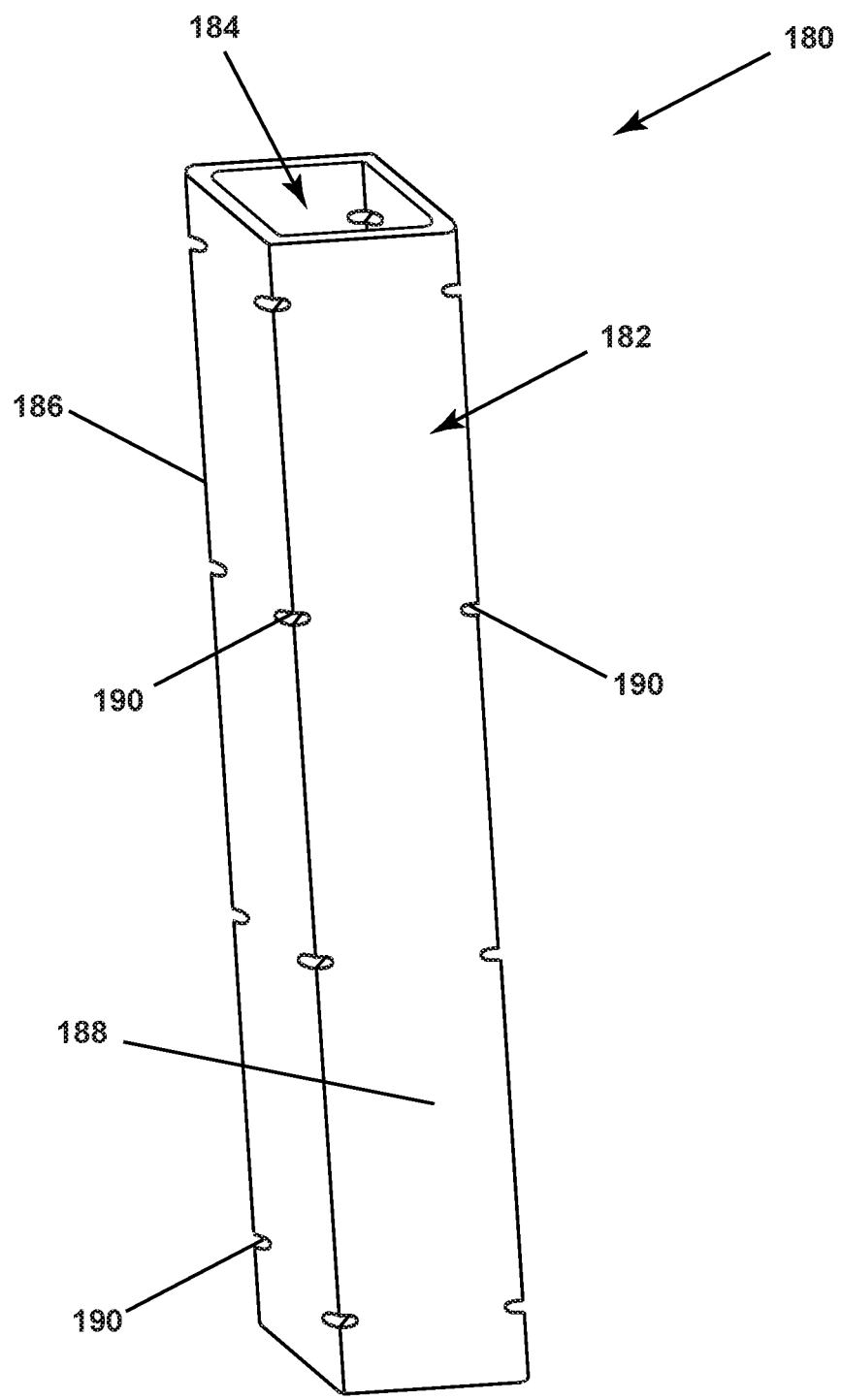
FIG. 6 shows an alternative stiffener including a set of crush initiators shown as slits along corners of the stiffener, in accordance with an exemplary embodiment of the present disclosure.

Referring to FIG. 6, illustrated is another exemplary stiffener 180 including a body 182 defining an interior 184, and having a set of corners 186 and a set of faces 188. A set of crush initiators 190 are positioned as slits in the corners 186. The slits can extend fully or partially through the body 182. The crush initiators 190 extend at least partially through the body 182, and as shown, the crush initiators 190 extend fully through the body 182, exposing the interior 184.

Figure 7:
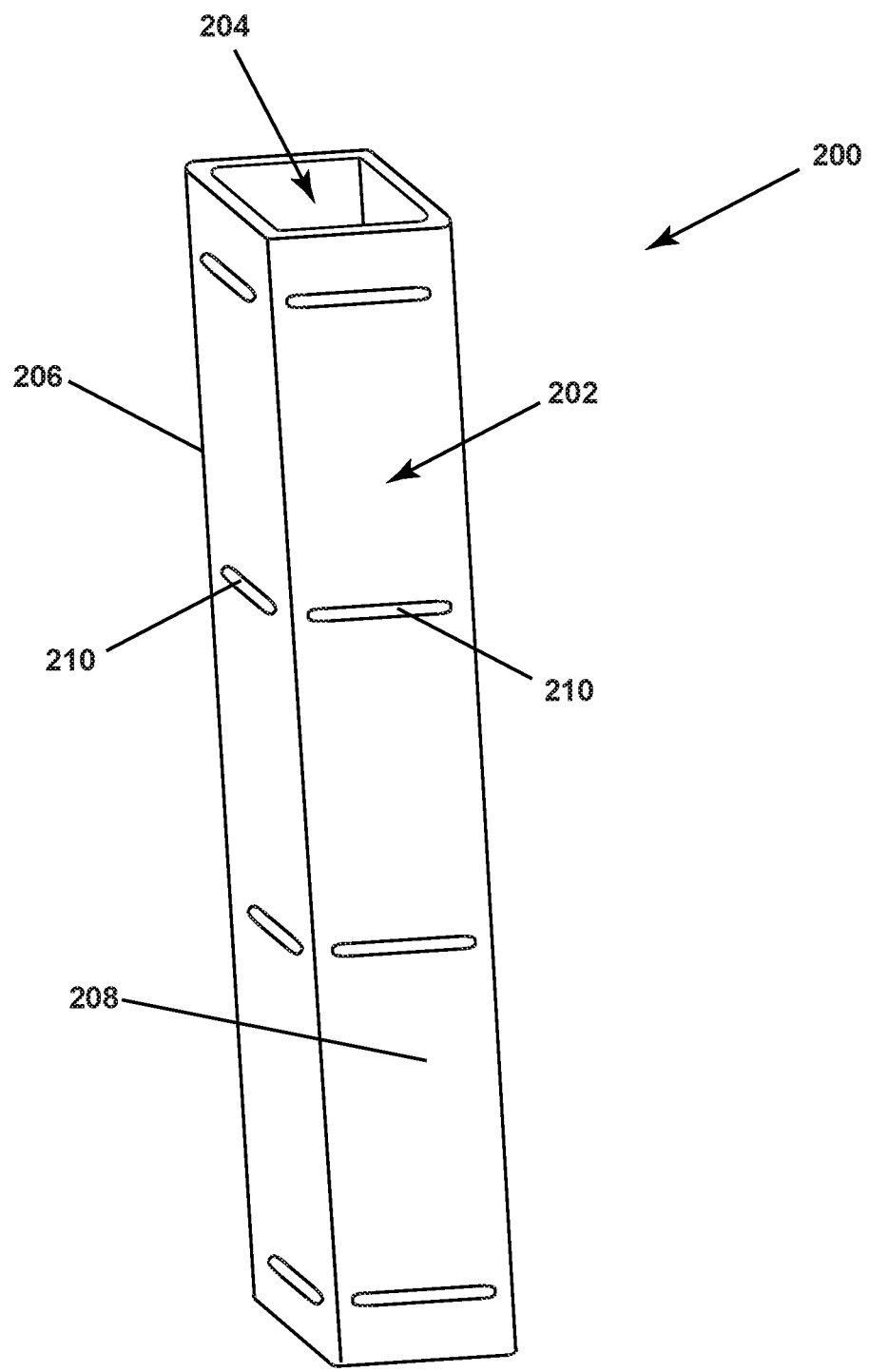
FIG. 7 shows another alternative stiffener including a set of crush initiators shown as slits along faces of the stiffener, in accordance with an exemplary embodiment of the present disclosure.

Referring to FIG. 7, similar to that of FIG. 6, illustrated is another exemplary stiffener 200 including a body 202 defining an interior 204, and having a set of corners 206 and a set of faces 208. A set of crush initiators 210 are positioned as slits extending across the faces 208. While the slits are arranged on the faces 208 and spaced from the corners 206, it should be appreciated that the slits can be positioned on both or either of the set of corners 206 and the set of faces 208. Additionally, while shown as arranged transverse across each face 208 of the set of faces 208, the slits can be arranged transverse, axially, longitudinally, or at an angle along the set of faces 208. Additionally, while the slits are shown as aligned among the faces 208 of the set of faces 208, an unaligned or offset arrangement is contemplated.

Figure 8:
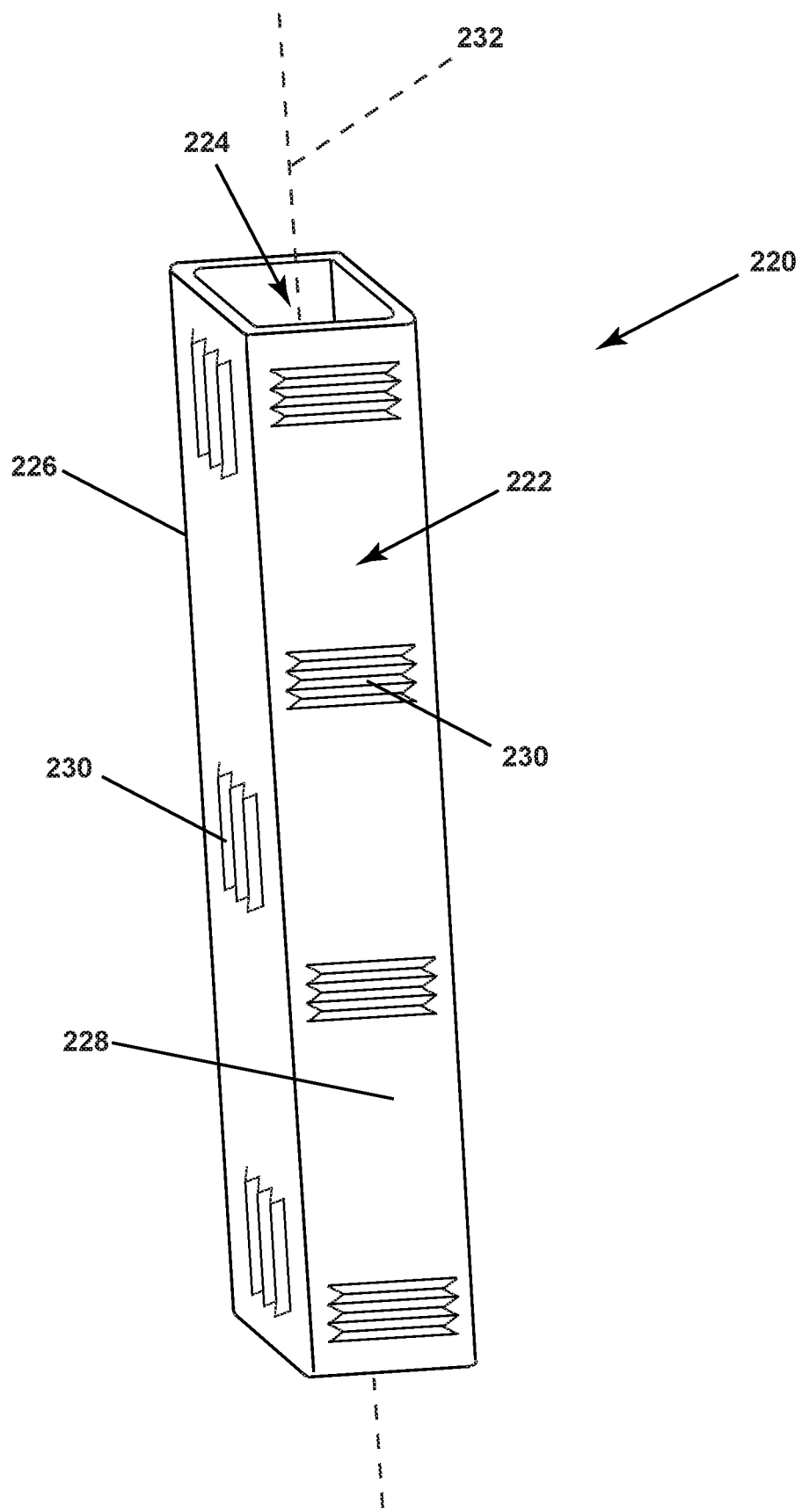
FIG. 8 shows yet another alternative stiffener including a set of crush initiators shown as corrugations along faces of the stiffener, in accordance with an exemplary embodiment of the present disclosure.

Referring to FIG. 8, illustrated is another exemplary stiffener 220 including a body 222 defining an interior 224 with a longitudinal axis 232 defined along the body 222 through the interior 224. The body 222 has a set of corners 226 and a set of faces 228. A set of crush initiators 230 are arranged as corrugations within the set of faces 228, while corrugations on the set of corners 226 is contemplated. Corrugations as used herein can include alternate ridges and valleys. In one example, the body 222 can be contracted into a wrinkled geometry, where the wrinkles define the alternate ridges and valleys, or a set of wrinkles, folds, or furrows. The crush initiators 230 are arranged as sets of corrugations positioned on the faces 228. In alternative, non-limiting examples, it is contemplated that the corrugations can be positioned on only one face 228, or any combination of faces 228, or can cover the entirety of one or more faces 228. Furthermore, it is contemplated that the corrugations can be positioned on the corners 226, or can span both corners 226 and faces 228.

It should be appreciated that some or all of the crush initiators 230 can be staggered on different or adjacent faces of the set of faces 228, such as in an axial or radial direction, for example. As can be seen in FIG. 8, some of the crush initiators 230 are staggered in a direction defined along the longitudinal axis 232, with the stagger being arranged among adjacent faces of the set of faces 228. Without utilizing a stagger, alignment of multiple crush initiators 230 may result in a stiffness for the stiffener 220 that may not bear standard operating loads. Therefore, a staggered arrangement can be utilized to ensure that the stiffeners 220 maintain a base threshold stiffness prior to deformation under a deformation threshold.

Figure 9:
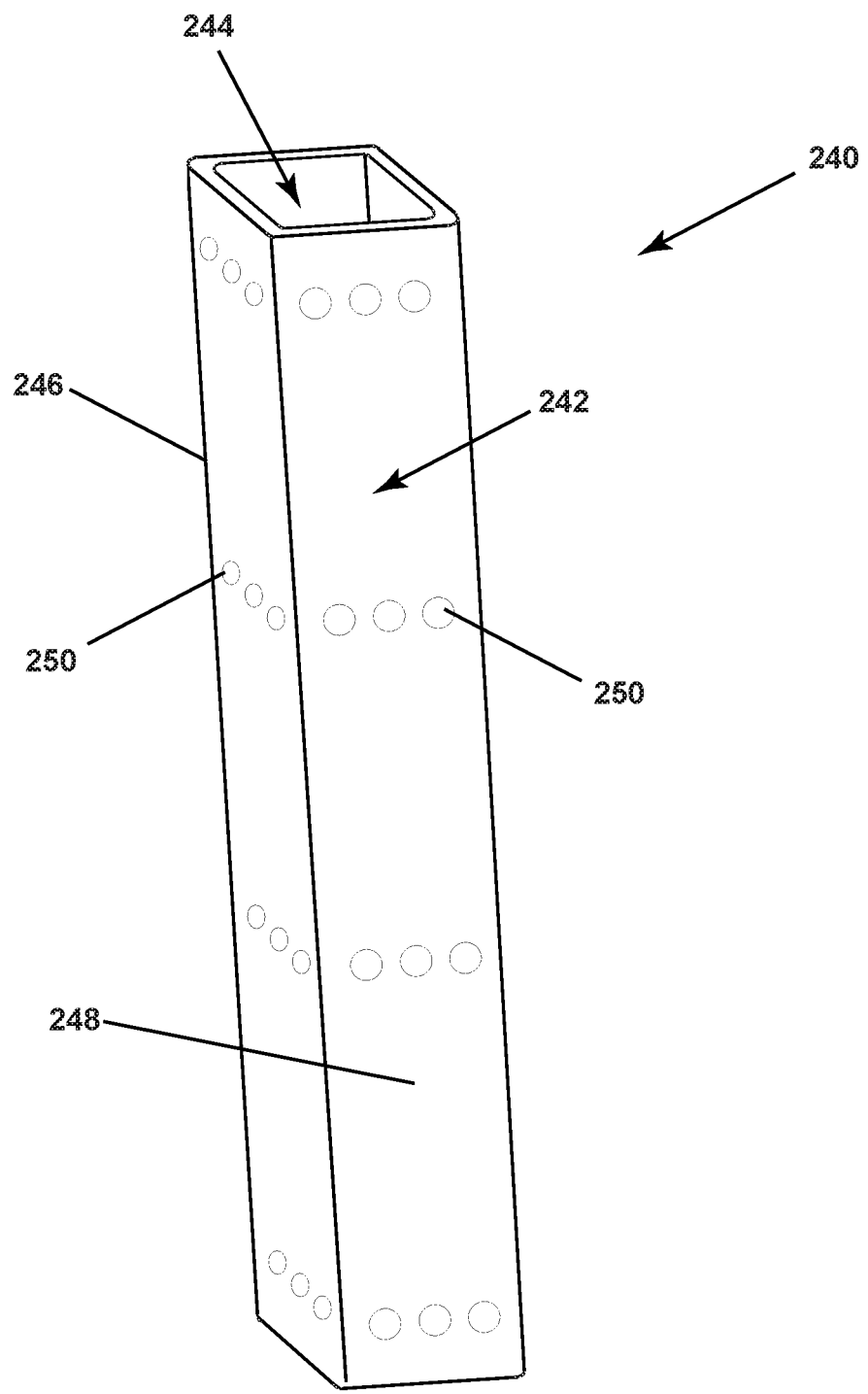
FIG. 9 shows yet another alternative stiffener including a set of crush initiators shown as dimples along faces of the stiffener, in accordance with an exemplary embodiment of the present disclosure.

Referring to FIG. 9, illustrated is another exemplary stiffener 240 including a body 242 defining an interior 244, and having a set of corners 246 and a set of faces 248. A set of crush initiators 250 are arranged as dimples. The crush initiators 250 are arranged as sets of three dimples positioned on each of the faces 228. In alternative, non-limiting examples, it is contemplated that the crush initiators 250, or sets thereof, can be arranged in any position, size, arrangement, grouping, set, or number of sets. Sets of crush initiators 250 can include any number of crush initiators 250 in each set, and can include any position, such as on the corners 246 or the faces 248. Furthermore, while the dimples are arranged in an aligned manner, it should be appreciated that an unaligned or discrete arrangement is contemplated. Such an unalignment may be defined among the crush initiators 250 among adjacent faces 248 of the set of faces 248, such as a staggered or offset arrangement. The dimples can be provided on the set of corners 246 or the set of faces 248, or both. Furthermore, in one alternative, non-limiting example, it is contemplated that the crush initiators 250 are arranged as openings extending through the body 242 into the interior 244. Further still, while the dimples or openings are shown as circular, any suitable shape is contemplated.

It should be understood that while only one type of crush initiator within a single stiffener is shown in FIG. 4, and FIGS. 6-9, it should be appreciated that more than one type of crush initiator can be utilized within a single stiffener. For example, a stiffener can include the crush initiators 190 of FIG. 6 positioned in the corners, while also including the corrugated crush initiators 230 of FIG. 8. In this way, it should be understood that multiple different types of crush initiators as described herein can be used within a single crush initiator, or within a single engine component. Using more than one type of crush initiator can better determine the crush geometry when subject to different forces or different directions of forces. More specifically, the type of crush initiator can be used to control local deformation of the stiffener, or local resulting geometries after deformation.

Figure 10:
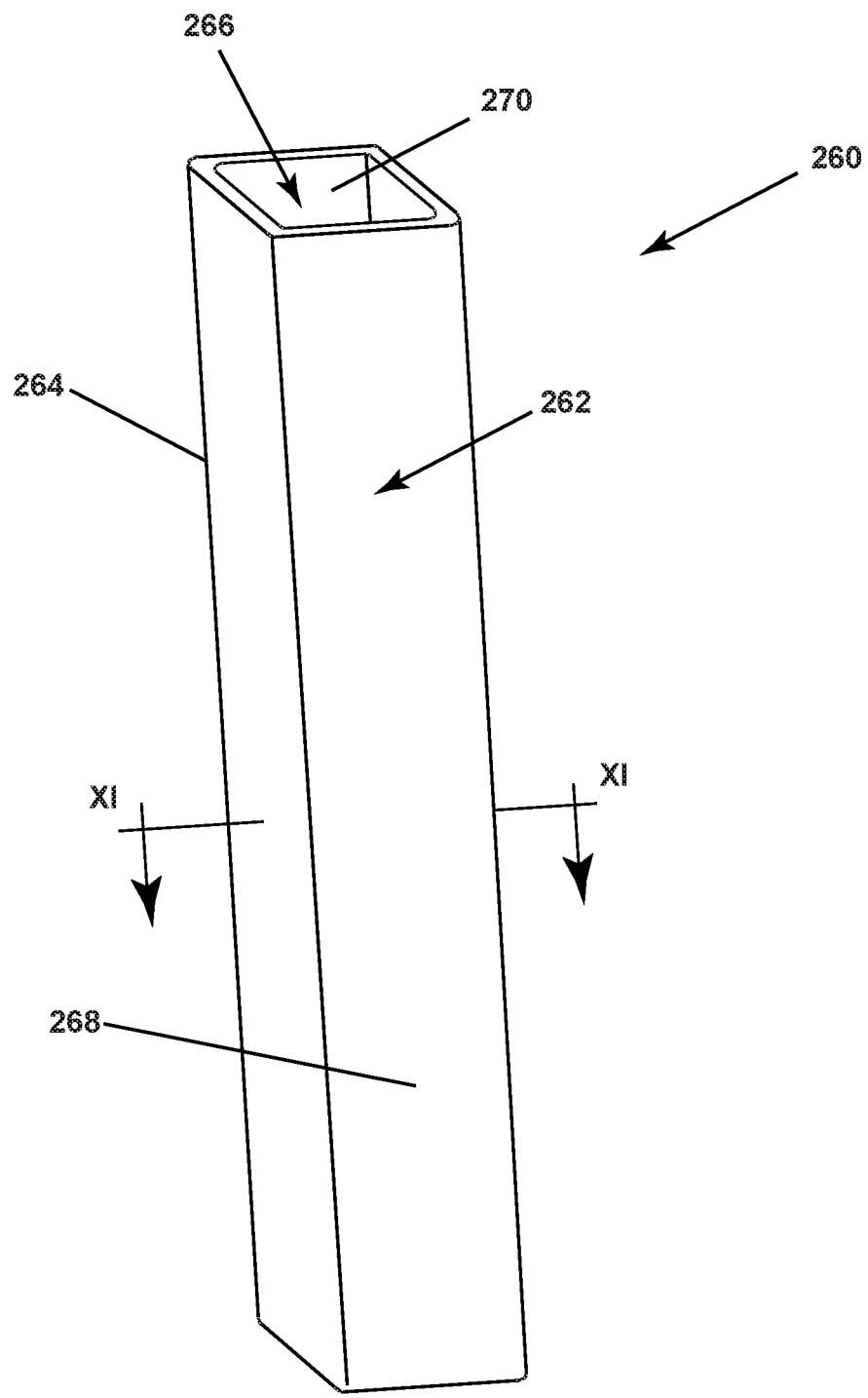
FIG. 10 shows yet another alternative stiffener having an interior surface, in accordance with an exemplary embodiment of the present disclosure.
Figure 11:
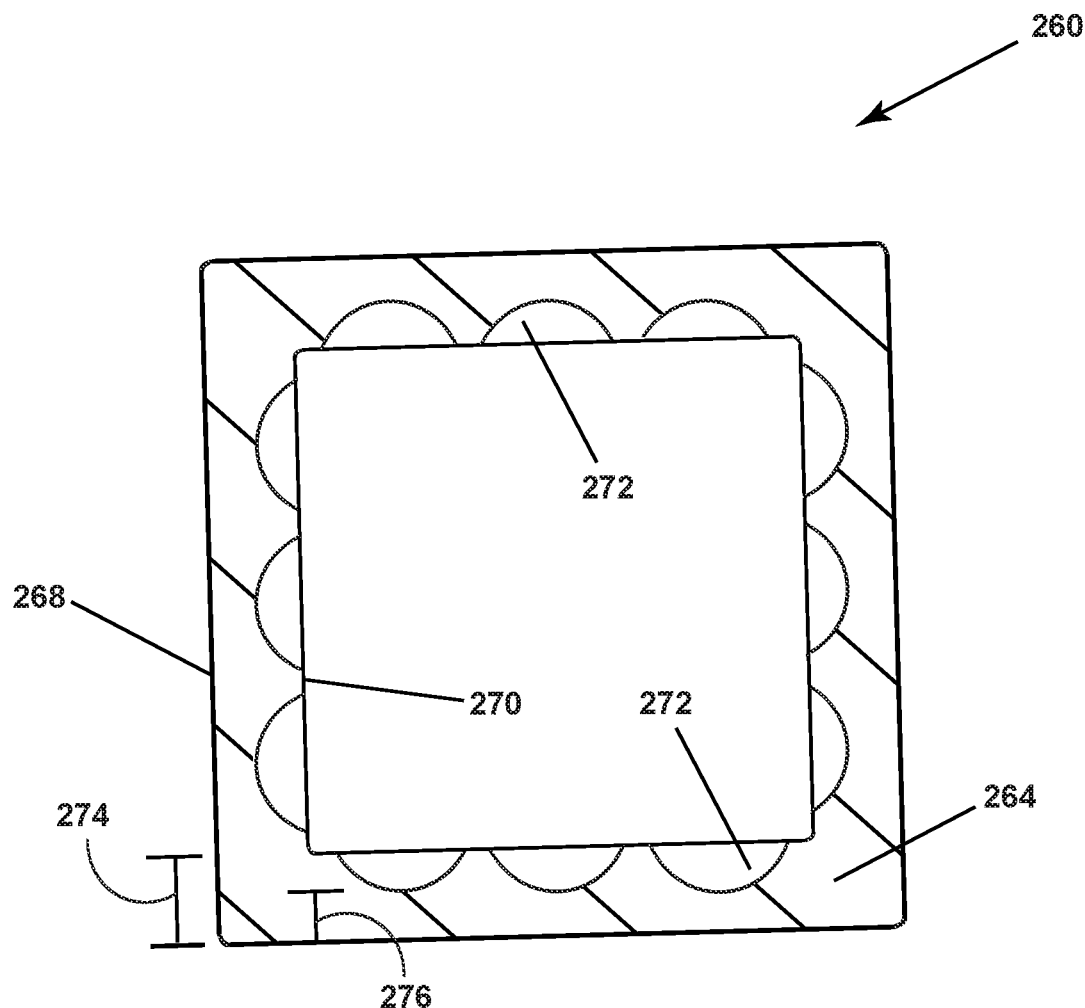
FIG. 11 shows a section view of the stiffener of FIG. 10 taken along line XI-XI of FIG. 10, showing a crush initiator on an interior surface of the stiffener, in accordance with an exemplary embodiment of the present disclosure.

Referring to FIG. 10, another exemplary stiffener 260 includes a body 262 having an outer wall 264 at least partially surrounding an interior 266. The outer wall 264 includes an exterior surface 268 and an interior surface 270 at least partially defining the interior 266. FIG. 11 shows a sectional view of the stiffener 260 of FIG. 10 taken along line XI-XI of FIG. 10, better showing the interior surface 270. The interior surface 270 includes a set of crush initiators 272, and line XI-XI is taken through the set of crush initiators 272. The crush initiators 272 are shown as recesses on the interior surface 270, extending into the outer wall 264.

The crush initiators 272 can be formed as areas of the outer wall 264 as a locally reduced thickness. The outer wall 264 includes a thickness 274 away from, spaced from, or without the crush initiators 272. Additionally, the crush initiators 272 can define a reduced thickness 276, where the reduced thickness 276 is less than that of the thickness 274 of the outer wall 264, and where the reduced thickness 276 defines the crush initiator 272.

Figure 12:
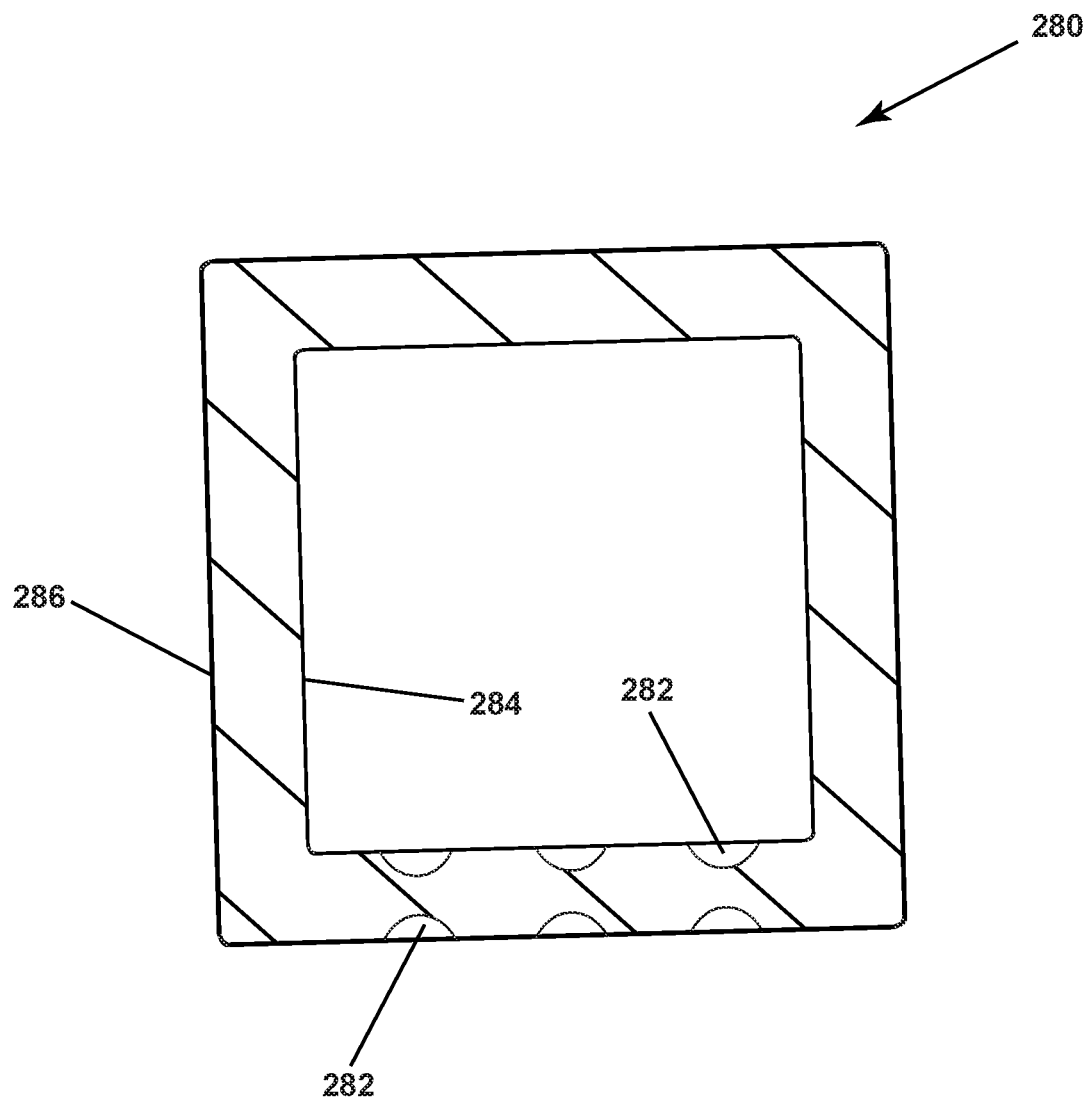
FIG. 12 shows a section view of another alternative stiffener including complementary crush initiators provided on an interior surface and an exterior surface of the stiffener, in accordance with an exemplary embodiment of the present disclosure.

Referring to FIG. 12, showing a section view of an exemplary stiffener 280 having crush initiators 282 provided on both an interior surface 284 and an exterior surface 286. It should be appreciated that the crush initiators 282 on the interior surface 282 need not be formed as recesses as shown, but can include any structural feature defining a crush initiator. It should be understood that the crush initiators 282 can be positioned on either or both of the interior surface 284 and the interior surface 286 of the stiffener 280. Additionally, the crush initiators 282 on the interior surface 284 can be complementary to the crush initiators 282 on the exterior surface 284, such that the arrangement of the crush initiators 282 is matched or similarly positioned among the interior and exterior surfaces 284, 286. Such a complementary arrangement can include an alignment among the crush initiators 282 on the interior and exterior surfaces 284, 286. In additional non-limiting examples, the complementary arrangement can include an orientation of the crush initiators 282, a chord-wise position, a span-wise position, or other relationship among crush initiators 282 on the interior and exterior surfaces 284, 286, a similar type or geometry, thickness, or pattern, or combinations thereof. In another non-limiting example, a discrete arrangement without regard to another crush initiator 282, is contemplated. Such a discrete arrangement can include an offset or misalignment among the crush initiators 272 on the interior surface 270 relative to the crush initiators 272 on the exterior surface 268.

Figure 13:
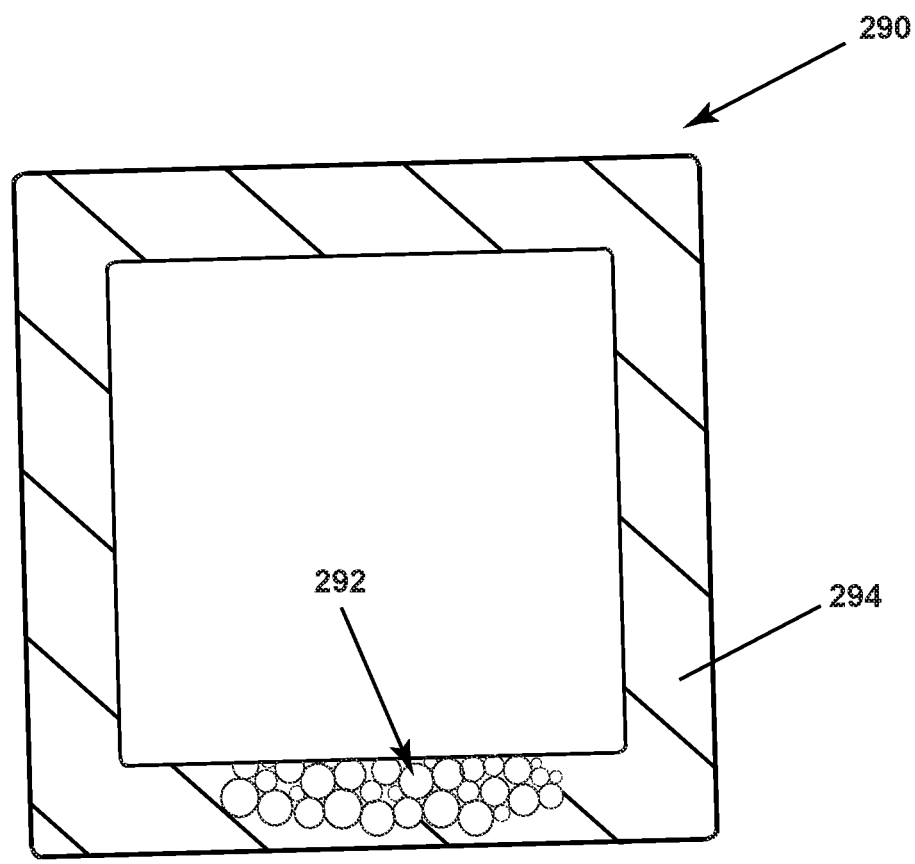
FIG. 13 shows a section view of another alternative stiffener including a porous structure defining a crush initiator, in accordance with an exemplary embodiment of the present disclosure.

Referring now to FIG. 13, showing a section view of an exemplary stiffener 290 having crush initiators 292 partially forming an outer wall 294 for the stiffener 290. The crush initiators 292 can be formed as a porous material or porous portion of the outer wall 294, where the crush initiators 292 are formed as a plurality of pores defining the porous portion. The porous structure forming or formed into the stiffener 290 defines the crush initiators 272. In one example, the porous structure can be defined by additive manufacturing of the stiffener 290, or by utilizing a metal foam. Furthermore, the crush initiator 292 can be defined on a cellular level, wherein the crush initiator 292 is defined by a cellular structure that is different than a cellular structure of the remainder of the outer wall 294. Such a cellular structure can be defined through additive manufacturing, for example. In this way, a porous structure or a cellular structure of the stiffener 290 can define the crush initiators 292, where the porous structure or cellular structure of the stiffener 290 at the crush initiator 292 is different than the porous structure or cellular structure of the stiffener 290 away or spaced from the crush initiator 292.

Figure 14:
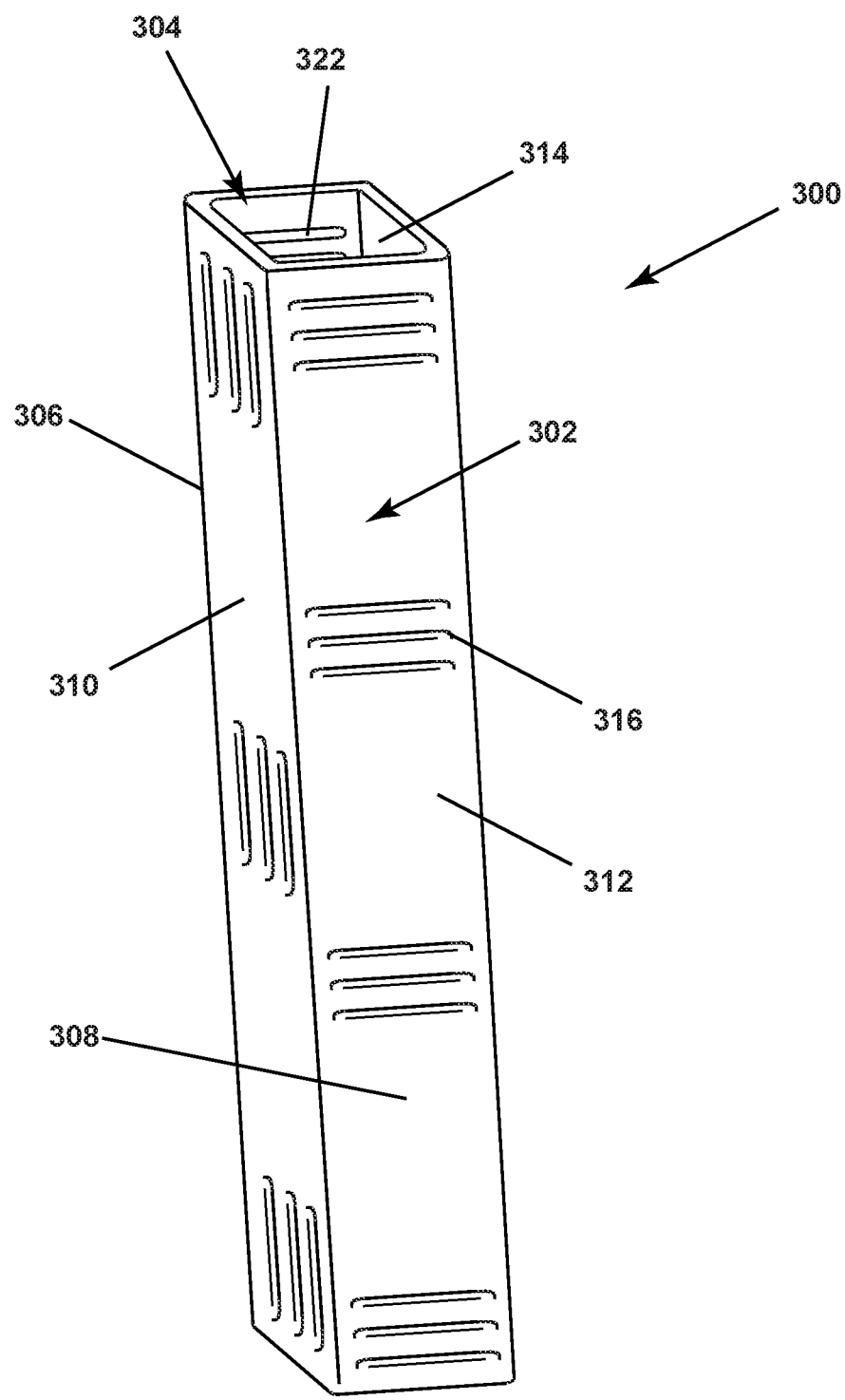
FIG. 14 shows yet another alternative stiffener including a set of crush initiators shown as ridges along faces of the stiffener, in accordance with an exemplary embodiment of the present disclosure.

Referring to FIG. 14, illustrated is another exemplary stiffener 300 including a body 302 defining an interior 304, and having a set of corners 306 and a set of faces 308. The body 302 further includes an outer wall 310 with an exterior surface 312 and an interior surface 314. A set of crush initiators 316 are arranged as ridges that protrude from the outer wall 310. The crush initiators 316 are arranged as sets of three ridges positioned on the faces 308 of the exterior surface 312. In alternative, non-limiting examples, it is contemplated that the crush initiators 316, or sets of ridges, can be arranged in any position, size, arrangement, grouping, set, or number of sets. Sets of ridges can include any number of ridges in each set, and can include any position, such as on the corners 306 or the faces 308.

It should be understood that the ridges are formed as additional material, being excess than that of the remainder of the body 302. The ridges define local strengthened areas due to the relatively greater material, with areas of relatively less strength between adjacent ridges due to the relatively lesser material. In this way, it should be appreciated that the ridges define locally strengthened areas, which define adjacent, relatively weakened areas, thereby determining the deformation geometry via the weakened areas defined by a relative difference in strength with the ridges. In alternative examples, the additional material need not be in the form of ridges, but can be any suitable shape or geometry having relatively greater material than that of the adjacent portions of the stiffener body.

The stiffener 300 further includes interior crush initiators 322 located on the interior surface 314. The interior crush initiators 322 positioned on the interior surface 314 are arranged or positioned complementary to crush initiator 316 positioned on the exterior surface 312, or another crush initiator. Such complementary positioning can be further determinative in controlling the deformation of the stiffeners, or airfoil containing the stiffeners.

Figure 15:
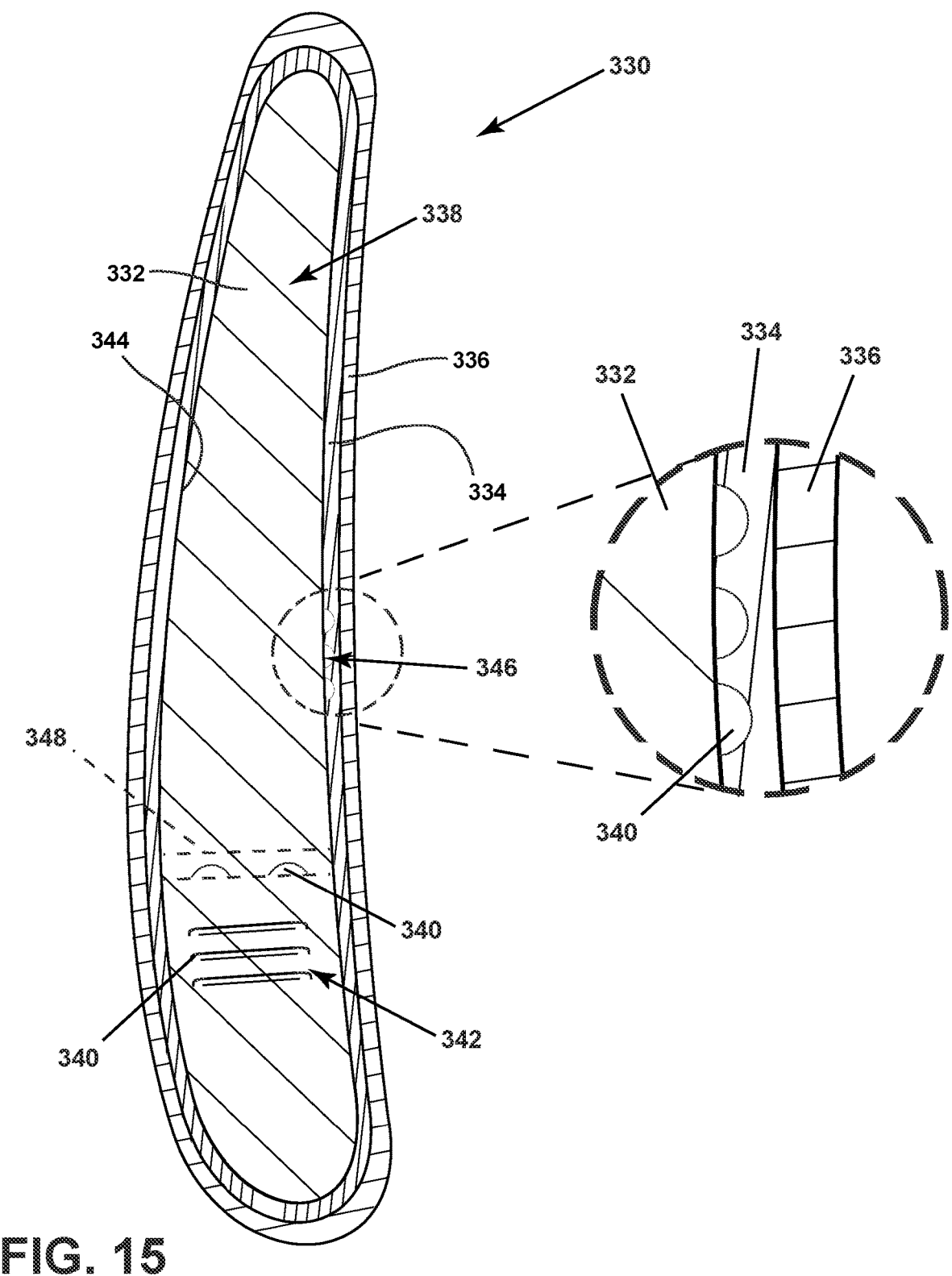
FIG. 15 shows an alternative airfoil including a set of crush initiators shown along a skin of the airfoil, in accordance with an exemplary embodiment of the present disclosure.

Referring to FIG. 15, illustrated is a cross-sectional view of another exemplary embodiment of an airfoil 330 that may be used in an airfoil assembly, generally similar to the airfoil assembly 100 of FIG. 2. The airfoil 330 includes a core 332, such as a fan blade core for a composite fan blade, an outer wall 334 at least partially surrounding or encasing an interior 338 including the core 332, and an exterior coating 336. The core 332 can have a deformation threshold as a core deformation threshold, which can be defined by the force required to cause deformation of the core 332. The core 332 can be any suitable composite material or structure, such as being dry, with no additional materials, or alternatively, be impregnated with a resin and cured in one non-limiting example. The core 332 can be comprised of composite materials, such as carbon or glass, while other materials such as nickel, titanium, or ceramic composites are contemplated in non-limiting examples.

The outer wall 334 can include a wall deformation threshold, which can be defined by the force required to cause deformation of the outer wall 334. Such a wall deformation threshold can be specific to the outer wall 334, or can be representative of a force required to deform the outer wall 334 when included with the interior core 332. The outer wall 334, in one non-limiting example, can be formed as a set of one or more laminate layers or plies, provided around or about the core 332. The outer wall 334 can be pre-impregnated, fiber placed, or dry fiber laminate layers, in non-limiting examples. Such laminate layers forming the outer wall 334 can be formed by resin transfer molding (RTM), partial RTM, same qualified resin transfer molding (SQRTM), or out-of-autoclave in non-limiting examples.

In one non-limiting example, the exterior coating 336 provided exterior of the outer wall 334, can be an environmental barrier coating, for example, which can be used to resist oxidization or corrosion, or a paint coating, A crush initiator 340 can be provided within or formed into one of the core 332 or the outer wall 334, or both. The crush initiator 340 can define a deformation threshold locally, which can be less than the core deformation threshold or the wall deformation threshold. Furthermore, a stiffener 348 can be provided within the core 332 or the outer wall 334, or formed as a part thereof. The stiffener 348 can be formed as a stiffened region or area for the core 332 or the outer wall 334, such that a local stiffness or strength is greater than adjacent areas of the core 332 or the outer wall 334. The crush initiator 340 can be provided within the stiffener 348, being formed as a portion of the stiffener 348, also forming a portion of the core 332 or the outer wall 334. The crush initiator 340 can have a deformation threshold that is less than the core deformation threshold or the wall deformation threshold, thereby determining crush geometry or deformation geometry of the core 332 or the outer wall 334 via the crush initiator 340. In this way, it is contemplated that the crush initiator 340 can be provided in the core 332 or outer wall 334 via the stiffener 348. In some engine components, it is desirable to control deformation in a deterministic way, but without incorporating the crush initiators 340 into stiffeners or only stiffeners. Utilizing stiffeners within an airfoil can increase total weight of that airfoil, where overall engine weight or efficiency restrictions may render use of multiple stiffeners impractical (while it is contemplated that stiffeners replacing core material or other material need not increase overall weight).

As shown, the core 332 includes a first set of crush initiators 342 and the outer wall 334 includes an interior surface 344 with a second set of crush initiators 346. It should be appreciated that the first set of crush initiators 342 can be positioned on any area or portion of the core 332, and the second set of crush initiators 346 can be formed into any surface or any layer forming the outer wall 334. Additionally, the first and second sets of crush initiators 342, 346 can be complementary to one another, such as arranged relative to one another to define a deformation shape in response to a force. The second set of crush initiators 346 as shown are located in the interior surface 344 of the outer wall 334, and shown as a recess. It should be appreciated that the second set of crush initiators 346 need not be a recess, but can be formed as any other feature for determining a deformation geometry of the airfoil 330. In alternative examples, a crush initiator on the exterior surface is contemplated, while such a location may negatively impact aerodynamic performance of an airfoil. In such a case, it would be beneficial to weigh the benefits of having a deterministic deformation geometry against engine performance. In this way, it should be understood that the crush initiator can be formed as a part of the fan blade or airfoil structure, such as part of the core or exterior layer structure, or including or in addition to stiffeners, which may or may not include the crush initiators.

The benefits associated with utilizing a stiffener or component having a crush initiator includes controlled and deterministic deformation of an airfoil, stiffener, or engine component in response to a force exceeding a deformation threshold for the airfoil, stiffener, or engine component. The crush initiators determine a deformation geometry for which the structure will deform in response to suitable force. Determining the deformation geometry permits a reduction in airfoil imbalance, as well as significant reduction in cascading effects, as compared to a component without controlled deformation. Additionally, the deformation can be controlled via the removal of material from a stiffener, reducing overall system weight, decreasing total engine weight, which can increase engine efficiency. Additionally, the reduction in weight and controlled deformation can result in greater than 0.1% fuel burn improvement, as well as greater ease of maintenance.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine comprising: a fan section, a compressor section, combustor section, and turbine section in serial flow arrangement, and defining an engine longitudinal axis; and an airfoil located in one of the fan section, the compressor section, and the turbine section, the airfoil comprising: an outer wall defining an interior, the outer wall extending between a leading edge and a trailing edge defining a chord-wise direction, and extending between a root and a tip defining a span-wise direction; and at least one stiffener located within the interior, having a deformation threshold, and including at least one crush initiator formed on the at least one stiffener.

The gas turbine engine of any preceding clause wherein the at least one stiffener has a deformed shape and a non-deformed shape, wherein the deformed shape relates to a shape of the at least one stiffener after exposure to a force exceeding the deformation threshold.

The gas turbine engine of any preceding clause wherein the stiffener includes a body defining a set of faces and a set of corners between adjacent faces.

The gas turbine engine of any preceding clause wherein the at least one crush initiator is a set of slits in the set of corners, with one set of slits in each corner of the set of corners.

The gas turbine engine of any preceding clause wherein the at least one crush initiator is a set of slits in the set of faces.

The gas turbine engine of any preceding clause wherein the stiffener includes a body having an interior surface and an exterior surface.

The gas turbine engine of any preceding clause wherein the at least one crush initiator is formed into the interior surface.

The gas turbine engine of any preceding clause wherein the at least one crush initiator is formed into the exterior surface.

The gas turbine engine of any preceding clause wherein the at least one crush initiator further comprises at least two crush initiators, with at least one crush initiator located on the interior surface and at least one crush initiator located on the exterior surface.

The gas turbine engine of any preceding clause wherein the at least one crush initiator located on the interior surface is complementary with the at least one crush initiator located on the exterior surface.

The gas turbine engine of any preceding clause wherein the at least one crush initiator located on the interior surface is offset or misaligned with the at least one crush initiator located on the exterior surface.

The gas turbine engine of any preceding clause wherein the at least one crush initiator is one or more of a slit, a dimple, a protrusion, a ridge, a corrugation, a thickness variation, or an opening.

The gas turbine engine of any preceding clause wherein the at least one stiffener includes multiple stiffeners.

The gas turbine engine of any preceding clause wherein each of the stiffeners in the multiple stiffeners includes at least one crush initiator.

The gas turbine engine of any preceding clause wherein the airfoil is a fan blade located in the fan section.

The gas turbine engine of any preceding clause wherein the at least one crush initiator is at least two crush initiators, and wherein the at least two crush initiators are different.

The gas turbine engine of any preceding clause wherein the stiffener defines a longitudinal axis, and wherein the at least one crush initiator is provided as multiple crush initiators staggered along the stiffener in a direction along the longitudinal axis.

The gas turbine engine of any preceding clause wherein the at least one stiffener includes a set of faces, and wherein the multiple crush initiators are staggered among the set of faces.

The gas turbine engine of any preceding clause wherein the at least one crush initiator is formed into the at least one stiffener as reduced thickness region, wherein a cross-sectional thickness of the at least one stiffener at the at least one crush initiator is less than a cross-sectional thickness of the at least one stiffener without the at least one crush initiator.

The gas turbine engine of any preceding clause wherein the at least one stiffener extends in the spanwise direction.

The gas turbine engine of any preceding clause wherein the at least one crush initiator is positioned between 20% and 90% of a span defined in the span-wise direction.

The gas turbine engine of any preceding clause wherein 0% span in the spanwise direction positions at the root and 100% span in the spanwise direction positions at the tip.

The gas turbine engine of any preceding clause wherein the at least one crush initiator is positioned between 25% and 75% of a chord defined in the chord-wise direction.

The gas turbine engine of any preceding clause wherein 0% chord in the chord-wise direction positions at the leading edge and 100% chord in the chord-wise direction positions at the trailing edge.

The gas turbine engine of any preceding clause the at least one crush initiator defines the deformed shape after the force exceeding the deformation threshold.

The gas turbine engine of any preceding clause wherein the at least one crush initiator is formed integrally within the at least one stiffener.

The gas turbine engine of any preceding clause wherein the at least one crush initiator is defined by a porous structure formed within the at least one stiffener.

The gas turbine engine of any preceding clause wherein the at least one crush initiator is defined by a cellular structure of the at least one stiffener that is different than a cellular structure of the at least one stiffener not at the at least one crush initiator.

The gas turbine engine of any preceding clause wherein the at least one crush initiator is additively manufactured as part of the at least one stiffener.

The gas turbine engine of any preceding clause wherein the at least one crush initiator is formed as a slit in the at least one stiffener.

The gas turbine engine of any preceding clause wherein the at least one crush initiator is formed as a slit in the at least one stiffener.

The gas turbine engine of any preceding clause wherein the at least one crush initiator is formed as a corrugation in the at least one stiffener.

The gas turbine engine of any preceding clause wherein the at least one crush initiator is formed as a divot in the at least one stiffener.

The gas turbine engine of any preceding clause wherein the at least one crush initiator is formed as a set of dimples in the at least one stiffener.

The gas turbine engine of any preceding clause wherein the at least one crush initiator is formed as a ridge in the at least one stiffener.

The gas turbine engine of any preceding clause wherein the at least one crush initiator extends fully through the at least one stiffener.

The gas turbine engine of any preceding clause wherein the at least one crush initiator extends partially through the at least one stiffener.

The gas turbine engine of any preceding clause wherein the at least one crush initiator is positioned on at least one corner of the set of corners.

The gas turbine engine of any preceding clause wherein the at least one crush initiator is positioned on at least one face of the set of faces.

The gas turbine engine of any preceding clause wherein the at least one crush initiator is positioned on both at least one corner of the set of corners and at least one face of the set of faces.

A composite fan blade for a turbine engine, the composite fan blade comprising: a fan blade core having a deformation threshold; an outer wall at least partially surrounding the fan blade core; a stiffener at least partially forming one of the fan blade core or the outer wall; and a crush initiator formed into the stiffener for controlling deformation of the composite fan blade in response to a force exceeding the deformation threshold.

The composite fan blade of any preceding clause wherein the stiffener includes a non-deformed shape and a deformed shape, wherein the non-deformed shape relates to the shape of the fan blade core under forces that do not exceed the deformation threshold, and wherein the deformed shape relates to the shape of the fan blade core after exposure to forces exceeding the deformation threshold.

The composite fan blade of any preceding clause wherein the stiffener is formed as a set of stiffeners, and the crush initiator is formed as a set of crush initiators, wherein the set of crush initiators are arranged among the set of stiffeners.

The composite fan blade of any preceding clause wherein the composite fan blade is adapted for use in an unducted fan assembly.

A fan blade for a turbine engine, the fan blade comprising: a core having a core deformation threshold, an outer wall, exterior of the core, having an exterior surface and an interior surface at least partially defining an interior, with the outer wall having a wall deformation threshold; and a crush initiator at least partially defining one of the core or the outer wall for controlling deformation thereof in response to a force exceeding either of the core deformation threshold or the wall deformation threshold.

The fan blade of any preceding clause wherein the crush initiator is formed in the interior surface of the outer wall.

The fan blade of any preceding clause wherein the crush initiator is formed in the core.

The fan blade of any preceding clause wherein the crush initiator further includes at least two crush initiators, with at least one crush initiator of the at least two crush initiators formed in the core, and at least one crush initiator of the at least two crush initiators formed in the outer wall.

The fan blade of any preceding clause wherein the at least one crush initiator formed in the core is complementary to the at least one crush initiator formed in the outer wall.

The fan blade of any preceding clause further comprising at least one stiffener at least partially forming the core.

The fan blade of any preceding clause further comprising a stiffener crush initiator located on the stiffener.

The fan blade of any preceding clause wherein the outer wall further comprises at least one stiffener, and the crush initiator is located on the stiffener.

The fan blade of any preceding clause wherein the crush initiator at least partially defines both the core and the outer wall.

What is claimed is:

1. A gas turbine engine comprising:
   a fan section, a compressor section, a combustor section, and a turbine section in serial flow arrangement; and
   an airfoil extending between a leading edge and a trailing edge defining a chord-wise direction, extending between a root and a tip defining a span-wise direction, and defining an interior, the airfoil located in one of the fan section, the compressor section, or the turbine section; and
   at least one stiffener located within the interior, having a deformation threshold, and including at least one crush initiator formed on the at least one stiffener;
   wherein the at least one crush initiator defines a crush geometry specifying a deformation geometry for the stiffener after experiencing a force exceeding the deformation threshold.

2. The gas turbine engine of claim 1 wherein the at least one stiffener has a deformed shape, defined by the crush initiator, and a non-deformed shape, wherein the deformed shape relates to a shape of the at least one stiffener at the crush initiator after exposure to a force exceeding the deformation threshold.

3. The gas turbine engine of claim 1 wherein the at least one stiffener includes a body defining a set of faces and a set of corners between adjacent faces.

4. The gas turbine engine of claim 3 wherein the at least one crush initiator is a set of slits in the set of corners, with one set of slits in each corner of the set of corners.

5. The gas turbine engine of claim 3 wherein the at least one crush initiator is a set of slits in the set of faces.

6. The gas turbine engine of claim 1 wherein the at least one stiffener includes a body having an interior surface and an exterior surface, and wherein the at least one crush initiator further comprises at least two crush initiators, with at least one crush initiator located on the interior surface and at least one crush initiator located on the exterior surface.

7. The gas turbine engine of claim 6 wherein the at least one crush initiator located on the interior surface is complementary with the at least one crush initiator located on the exterior surface.

8. The gas turbine engine of claim 1 wherein the at least one crush initiator is formed as one or more of slits, dimples, protrusions, ridges, corrugations, porous material, or recesses.

9. The gas turbine engine of claim 1 wherein the at least one stiffener includes multiple stiffeners.

10. The gas turbine engine of claim 9 wherein each of the stiffeners in the multiple stiffeners includes at least one crush initiator.

11. The gas turbine engine of claim 1 wherein the airfoil is a fan blade located in the fan section.

12. The gas turbine engine of claim 1 wherein the at least one crush initiator is at least two crush initiators, and wherein the at least two crush initiators are different.

13. The gas turbine engine of claim 1 wherein the at least one stiffener defines a longitudinal axis, and wherein the at least one crush initiator is provided as multiple crush initiators staggered along the at least one stiffener in a direction along the longitudinal axis.

14. The gas turbine engine of claim 13 wherein the at least one stiffener includes a set of faces, and wherein the multiple crush initiators are staggered among the set of faces.

15. A composite fan blade for a turbine engine, the composite fan blade comprising:
a fan blade core having a deformation threshold;
an outer wall at least partially surrounding the fan blade core;
a stiffener at least partially forming one of the fan blade core or the outer wall; and
a crush initiator formed into the stiffener, wherein the crush initiator defines a crush geometry that specifies a geometry for deformation of the composite fan blade in response to a force exceeding the deformation threshold.

16. The composite fan blade of claim 15 wherein the stiffener includes a non-deformed shape and a deformed shape defined by the crush initiator, wherein the non-deformed shape relates to a shape of the fan blade core under forces that do not exceed the deformation threshold, and wherein the deformed shape relates to a shape of the fan blade core after exposure to forces exceeding the deformation threshold.

17. The composite fan blade of claim 15 wherein the stiffener is formed as a set of stiffeners, and the crush initiator is formed as a set of crush initiators, wherein the set of crush initiators are arranged among the set of stiffeners.

18. A fan blade for a turbine engine, the fan blade comprising:
a core having a core deformation threshold;
an outer wall, exterior of the core, having an exterior surface and an interior surface at least partially defining an interior, with the outer wall having a wall deformation threshold; and
a crush initiator at least partially defining at least one of the core or the outer wall;
wherein the crush initiator defines a crush geometry that specifies a geometry for deformation of at least one of the core or the outer wall in response to a force exceeding the core deformation threshold or the wall deformation threshold.

19. The fan blade of claim 18 further comprising at least one stiffener at least partially forming the core and wherein the crush initiator is provided on the at least one stiffener.

20. The fan blade of claim 18 wherein the crush initiator at least partially defines both the core and the outer wall.

* * * * *